US012754528B2

(12) United States Patent
Hattori

(10) Patent No.: US 12,754,528 B2
(45) Date of Patent: Oct. 6, 2026

(54) MACHINE TOOL, MACHINE TOOL CONTROL METHOD, AND NON-TRANSITORY COMPUTER READABLE MEDIUM HAVING MACHINE TOOL CONTROL PROGRAM

(71) Applicant: DMG MORI CO., LTD., Nara (JP)

(72) Inventor: Ryotaro Hattori, Nara (JP)

(73) Assignee: DMG MORI CO., LTD., Nara (JP)

( * ) Notice: Subject to any disclaimer, the term of this patent is extended or adjusted under 35 U.S.C. 154(b) by 513 days.

(21) Appl. No.: 18/277,100

(22) PCT Filed: Sep. 10, 2021

(86) PCT No.: PCT/JP2021/033293
§ 371 (c)(1),
(2) Date: Oct. 21, 2023

(87) PCT Pub. No.: WO2022/176241
PCT Pub. Date: Aug. 25, 2022

(65) Prior Publication Data
US 2024/0126230 A1 Apr. 18, 2024

(30) Foreign Application Priority Data
Feb. 17, 2021 (JP) ................................. 2021-023434

(51) Int. Cl.
*G05B 19/402* (2006.01)
*B23Q 15/12* (2006.01)
(Continued)

(52) U.S. Cl.
CPC .......... *G05B 19/402* (2013.01); *B23Q 15/12* (2013.01); *G05B 2219/32055* (2013.01)

(58) Field of Classification Search
CPC . G05B 19/402; G05B 19/409; G05B 19/4069
See application file for complete search history.

(56) References Cited

U.S. PATENT DOCUMENTS 4,631,465 A * 12/1986 Fukuyama ......... G05B 19/4069 700/173
2004/0186612 A1 9/2004 Edwards et al.
(Continued)

FOREIGN PATENT DOCUMENTS

WO 2013118179 A1 8/2013

*Primary Examiner* — Mark A Connolly
(74) *Attorney, Agent, or Firm* — IP Business Solutions, LLC.

(57) ABSTRACT

A technique for assisting a task of determining a tool that is a cause of a decrease in workpiece processing accuracy is provided. A machine tool capable of processing a workpiece using a plurality of tools includes a display and a control unit for controlling the machine tool. The control unit executes: a process of acquiring processing information that specifies a tool used in processing the workpiece and a processing route of the tool; a process of displaying, on the display, a three-dimensional model of the workpiece created based on the processing information; a process of receiving designation of a site with respect to the three-dimensional model displayed on the display; a process of determining, based on the processing information, an employed tool that has been involved in processing the designated site; and a process of displaying information on the employed tool on the display.

7 Claims, 12 Drawing Sheets

(51) Int. Cl.
*G05B 19/4069* (2006.01)
*G05B 19/409* (2006.01)

(56) References Cited

U.S. PATENT DOCUMENTS

| | | | | |
|---|---|---|---|---|
| 2016/0334777 | A1* | 11/2016 | Sato | B23Q 17/0909 |
| 2017/0146985 | A1* | 5/2017 | Maeda | G05B 23/027 |
| 2019/0080446 | A1* | 3/2019 | Kuzmin | G06V 10/44 |
| 2019/0171183 | A1* | 6/2019 | Brambach | B23Q 17/0952 |
| 2020/0230760 | A1* | 7/2020 | Kasahara | B23Q 3/15546 |

* cited by examiner

223

| START POINT | END POINT | TOOL TYPE | ROUTE TYPE | G-CODE |
|---|---|---|---|---|
| x1, y1, z1 | x2, y2, z2 | TOOL D | STRAIGHT LINE | G01 |
| x2, y2, z2 | x3, y3, z3 | TOOL B | ARC | G03 |
| ⋮ | ⋮ | ⋮ | ⋮ | ⋮ |

224

| TOOL INFORMATION | | | | | | |
|---|---|---|---|---|---|---|
| TOOL No. | TOOL TYPE | TOOL NAME | TOOL THICKNESS | TOOL LENGTH | TOOL IMAGE | ··· |
| 00010001 | TOOL A | Drill | r1 | d1 | IM1 | ··· |
| 00010002 | TOOL B | Tap | r2 | d2 | IM2 | ··· |
| 00010003 | TOOL C | FaceMill | r3 | d3 | IM3 | ··· |
| 00010004 | TOOL D | Bolling | r4 | d4 | IM4 | ··· |
| 00010005 | TOOL E | Tap | r5 | d5 | IM5 | ··· |
| 00010006 | TOOL F | Drill | r6 | d6 | IM6 | ··· |
| 00010007 | TOOL G | Drill | r7 | d7 | IM7 | ··· |
| ⋮ | ⋮ | ⋮ | ⋮ | ⋮ | ⋮ | ⋮ |

MACHINE TOOL, MACHINE TOOL CONTROL METHOD, AND NON-TRANSITORY COMPUTER READABLE MEDIUM HAVING MACHINE TOOL CONTROL PROGRAM

TECHNICAL FIELD

This disclosure relates to a technology for controlling display in a machine tool.

BACKGROUND ART

WO 2013/118179 (PTL 1) discloses a device for assisting a task of validating a processing program. This device assists the task of validating a processing program by displaying a tool path as superimposed on a three-dimensional model of a workpiece after processing.

CITATION LIST

Patent Literature

PTL 1: WO 2013/118179

SUMMARY OF INVENTION

Technical Problem

Various types of tools are used to process a workpiece. When tools are worn or tools are chipped, workpiece processing accuracy decreases. In this case, a worker needs to determine a tool that is a cause of the decrease in workpiece processing accuracy. The device disclosed in PTL 1 merely displays a tool path as superimposed on a three-dimensional model of a workpiece after processing. Therefore, the worker cannot determine the tool that is the cause of the decrease in workpiece processing accuracy.

This disclosure has been made to solve the problem as described above, and an object in one aspect is to provide a technology for assisting the task of determining the tool that is the cause of a decrease in workpiece processing accuracy.

Solution to Problem

In one example of this disclosure, a machine tool capable of processing a workpiece using a plurality of tools is provided. The machine tool includes a display and a control unit for controlling the machine tool. The machine tool executes: a process of acquiring processing information that specifies a tool used in processing the workpiece and a processing route of the tool; a process of displaying, on the display, a three-dimensional model of the workpiece created based on the processing information; a process of receiving designation of a site corresponding to a portion of the processed workpiece in the three-dimensional model displayed on the display; a process of determining, based on the processing information, an employed tool that has been involved in processing the designated site; and a process of displaying information on the employed tool on the display.

In one example of this disclosure, the control unit further executes: a process of acquiring a database in which pieces of size information on tools are associated on a tool-by-tool basis; and a process of acquiring size information associated with the employed tool among the pieces of size information specified in the database. The information displayed on the display in the process of displaying includes the size information acquired in the process of acquiring.

In one example of this disclosure, the machine tool further includes a camera provided inside the machine tool. The control unit further executes a process of acquiring a tool image representing the employed tool from the camera. The information displayed on the display in the process of displaying includes the tool image.

In one example of this disclosure, the machine tool further includes: a magazine capable of holding a plurality of tools; and a driving device for driving the magazine. The control unit further executes: a process of receiving designation of one employed tool among the employed tools displayed on the display; and a process of controlling the driving device so as to drive the designated one employed tool among the plurality of tools housed in the magazine to a predefined position.

In one example of this disclosure, the control unit executes a process of further displaying a processing route of the employed tool as superimposed on the three-dimensional model.

In another example of this disclosure, a control method of a machine tool capable of processing a workpiece using a plurality of tools is provided. The control method executes: acquiring processing information that specifies a tool used in processing the workpiece and a processing route of the tool; displaying, on a display of the machine tool, a three-dimensional model of the workpiece created based on the processing information; receiving designation of a site corresponding to a portion of a processed workpiece in the three-dimensional model displayed on the display; determining, based on the processing information, an employed tool that has been involved in processing the designated site; and displaying information on the employed tool on the display.

In another example of this disclosure, a control program of a machine tool capable of processing a workpiece using a plurality of tools is provided. The control program causes the machine tool to execute: acquiring processing information that specifies a tool used in processing the workpiece and a processing route of the tool; displaying, on a display of the machine tool, a three-dimensional model of the workpiece created based on the processing information; receiving designation of a site corresponding to a portion of a processed workpiece in the three-dimensional model displayed on the display; determining, based on the processing information, an employed tool that has been involved in processing the designated site; and displaying information on the employed tool on the display.

The above-described and other objects, characteristics, aspects, and advantages of the present invention will be apparent by the following detailed description about the present invention that is understood in connection with the accompanying drawings.

DESCRIPTION OF EMBODIMENTS

Each embodiment according to the present invention will be described below with reference to the drawings. In the following description, the same parts and configurations are denoted by the same reference sign. Their names and functions are also the same. Therefore, their detailed description will not be repeated. The embodiments and modified examples to be described below may be selectively combined as appropriate.

<A. Overview of Machine Tool 10>

Figure 1:
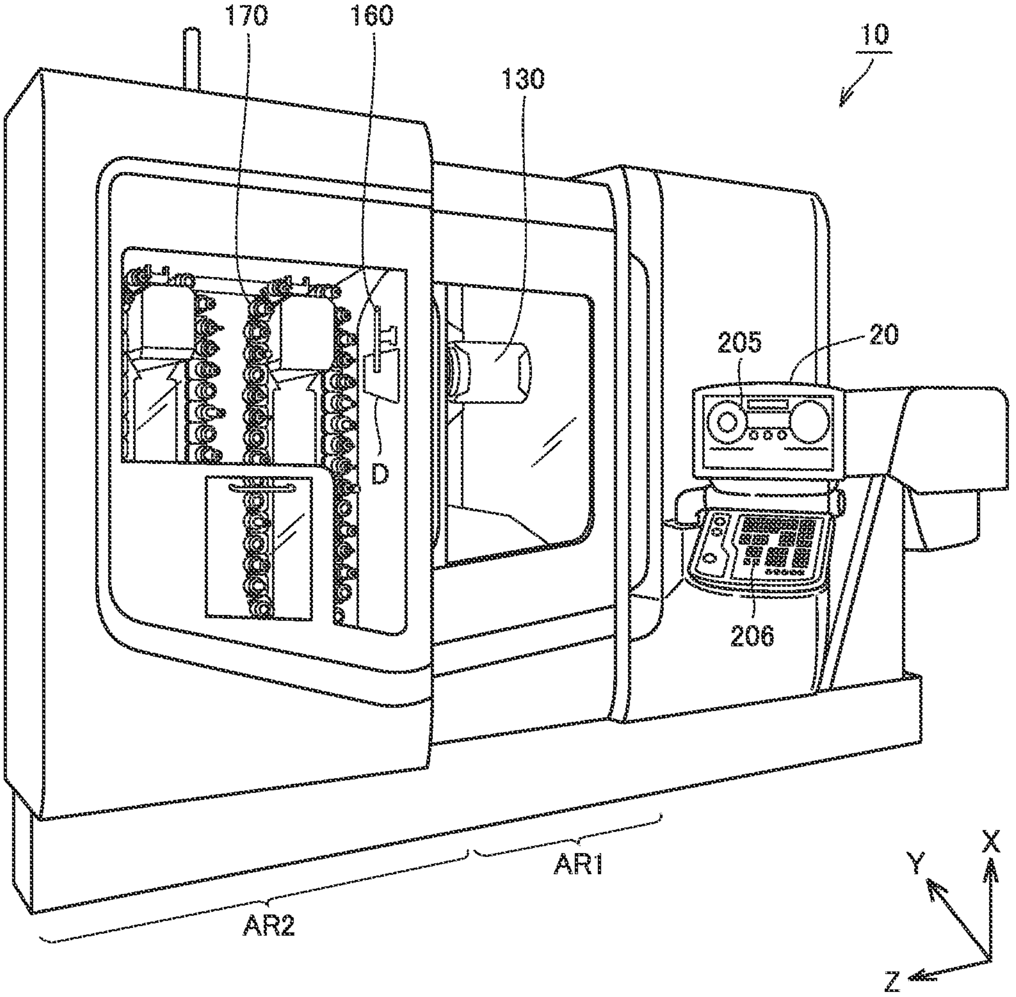
FIG. 1 is a diagram showing one example of a machine tool.

First, with reference to FIG. 1, an external appearance of a machine tool 10 will be described. FIG. 1 is a diagram showing one example of machine tool 10.

In FIG. 1, machine tool 10 as a machining center is shown. Machine tool 10 may be a horizontal machining center or may be a vertical machining center.

In the following, machine tool 10 as a machining center will be described, but machine tool 10 is not limited to a machining center. For example, machine tool 10 may be a lathe or may be an additive processing machine or may be other cutting machine or grinding machine.

Machine tool 10 is provided with a console 20. Console 20 includes a display 205 for displaying various pieces of information relating to processing, and operation keys 206 that receive various operations on machine tool 10.

Machine tool 10 has a processing area AR1 and a tool area AR2. Each of processing area AR1 and tool area AR2 is demarcated by a cover. In processing area AR1, a spindle head 130 is provided. In tool area AR2, an ATC 160 and a magazine 170 are provided. Magazine 170 is configured to be able to hold a plurality of tools. ATC 160 mounts a designated tool among the tools held by magazine 170 onto spindle head 130 through a door D provided in a partition between processing area AR1 and tool area AR2. Door D is a door of a sliding type and is opened or closed by a driving source, such as a motor.

<B. Overview>

Figure 2:
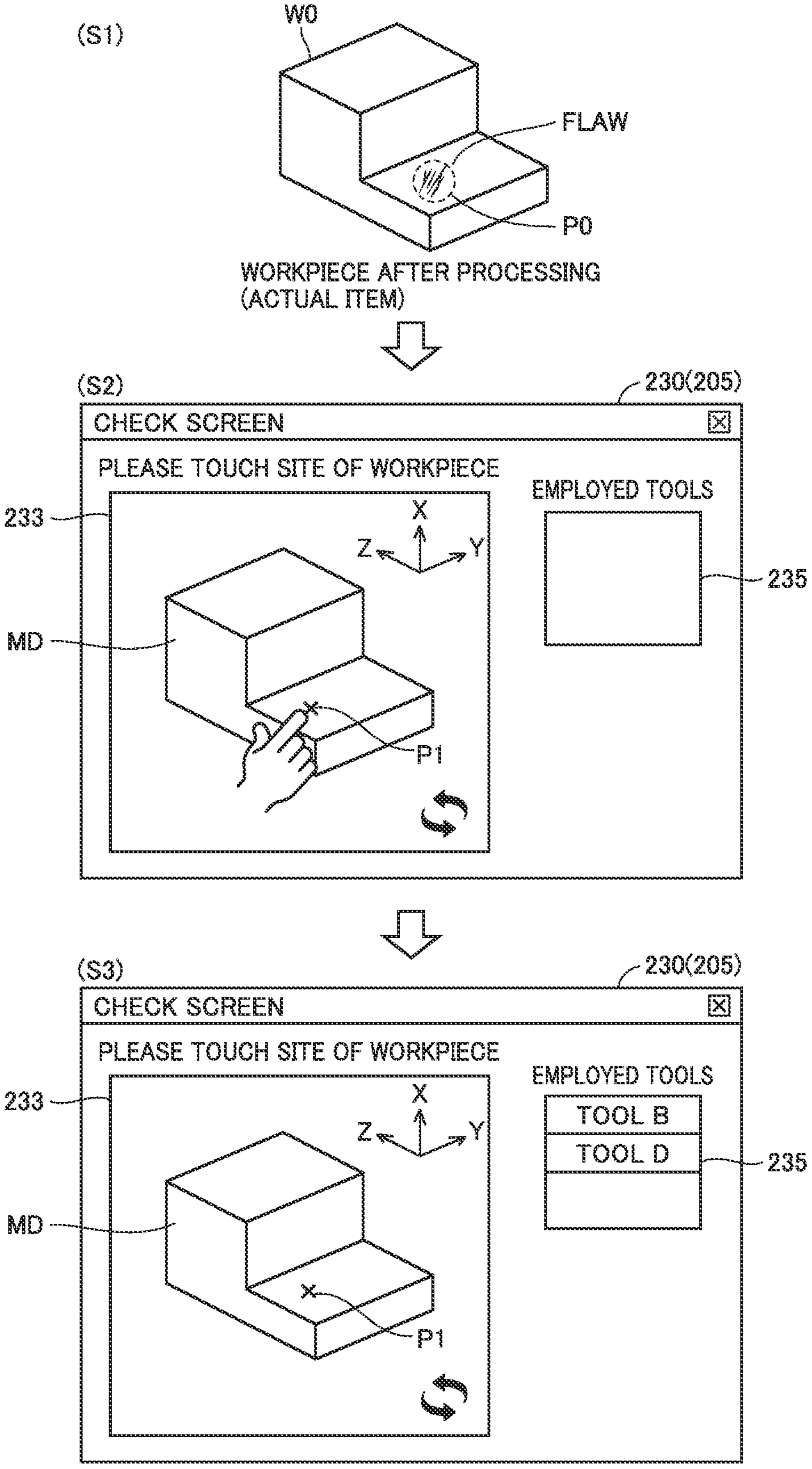
FIG. 2 is a diagram showing one example of a workpiece after processing and an example of a screen displayed in a console.

Next, with reference to FIG. 2, display control in console 20 will be described. FIG. 2 is a diagram showing one example of a workpiece after processing and an example of a screen displayed in console 20.

It is assumed that, as a result of processing by machine tool 10, for example, a workpiece W with a flaw has been obtained. In this case, a worker needs to determine a cause of the occurrence of the flaw. Flaws in workpieces W occur, for example, due to wearing of a tool or chipping of a tool. Therefore, to assist the worker in finding the cause, machine tool 10 presents tools that have been involved in processing a flawed portion P0 to the worker.

As a more specific procedure, in step S1, the worker checks whether workpiece W after processing has been processed as intended. It is assumed that, as a result, the worker has detected flawed portion P0 in workpiece W.

Next, in step S2, the worker displays a check screen 230 on display 205 of console 20. Check screen 230 includes display regions 233, 235.

In display region 233, a three-dimensional model MD of the workpiece is displayed. Three-dimensional model MD is three-dimensional data showing a shape of workpiece W after processing or in the middle of processing. The data form of three-dimensional model MD is freely selected. As one example, three-dimensional model MD may be a wire frame model that specifies a three-dimensional shape by a combination of points and lines, or may be a surface model that specifies a three-dimensional shape by a combination of surfaces, or may be a space lattice model that associates information showing the presence or absence or the type of an object with each coordinate value in three dimensions.

Further, for example, three-dimensional model MD may be downloaded from an external device, or may be defined by a user, or may be created based on processing information 223 (see FIG. 5), to be described later, that has been used in processing workpiece W. Processing information 223 is information specifying tools used in processing workpiece W and processing routes of the tools. Details of processing information 223 will be described later.

Console 20 creates a two-dimensional projected image representing three-dimensional model MD from a certain viewpoint by projection transformation and displays this projected image in display region 233. Typically, machine tool 10 changes the direction of display (the direction of projection) of three-dimensional model MD in conjunction with a user's operation in display region 233. As one example, the user can change the direction of display of three-dimensional model MD by sliding his or her finger in a state of touching display region 233.

Three-dimensional model MD displayed in display region 233 is configured to receive designation of a site. The "site" here means a portion of a surface of three-dimensional model MD. As one example, the "site" may be one surface among surfaces composing three-dimensional model MD, or may be one region in three-dimensional model MD, or may be one point in three-dimensional model MD.

In the example of FIG. 2, the worker designates a site P1 on three-dimensional model MD. Site P1 corresponds to flawed portion P0 of actual workpiece W. When machine tool 10 receives designation of site P1 in three-dimensional model MD, machine tool 10 determines one or more tools that have been involved in processing site P1 based on processing information 223 (see FIG. 5) to be described later. It is assumed that, as a result, "tool B" and "tool D" have been determined.

Next, in step S3, machine tool 10 displays tool information on "tool B" and "tool D" having been determined in display region 235. As one example, the tool information includes at least one of a tool type, a tool name, a tool thickness, a tool length, and a tool image. The tool thickness represents a radius or a diameter of the tool in a direction orthogonal to an axial direction of a spindle 132 (see FIG. 3) to be described later. The tool length represents the length of the tool in the axial direction of spindle 132. In the example of FIG. 2, as the tool information, the tool names "tool B" and "tool D" are displayed in display region 235.

Thus, the worker can learn information on tools that have processed flawed portion P0 of workpiece W. By checking the states of these tools, the worker can look into the cause of the flaw in workpiece W.

<C. Driving Mechanisms of Machine Tool 10>

Figure 3:
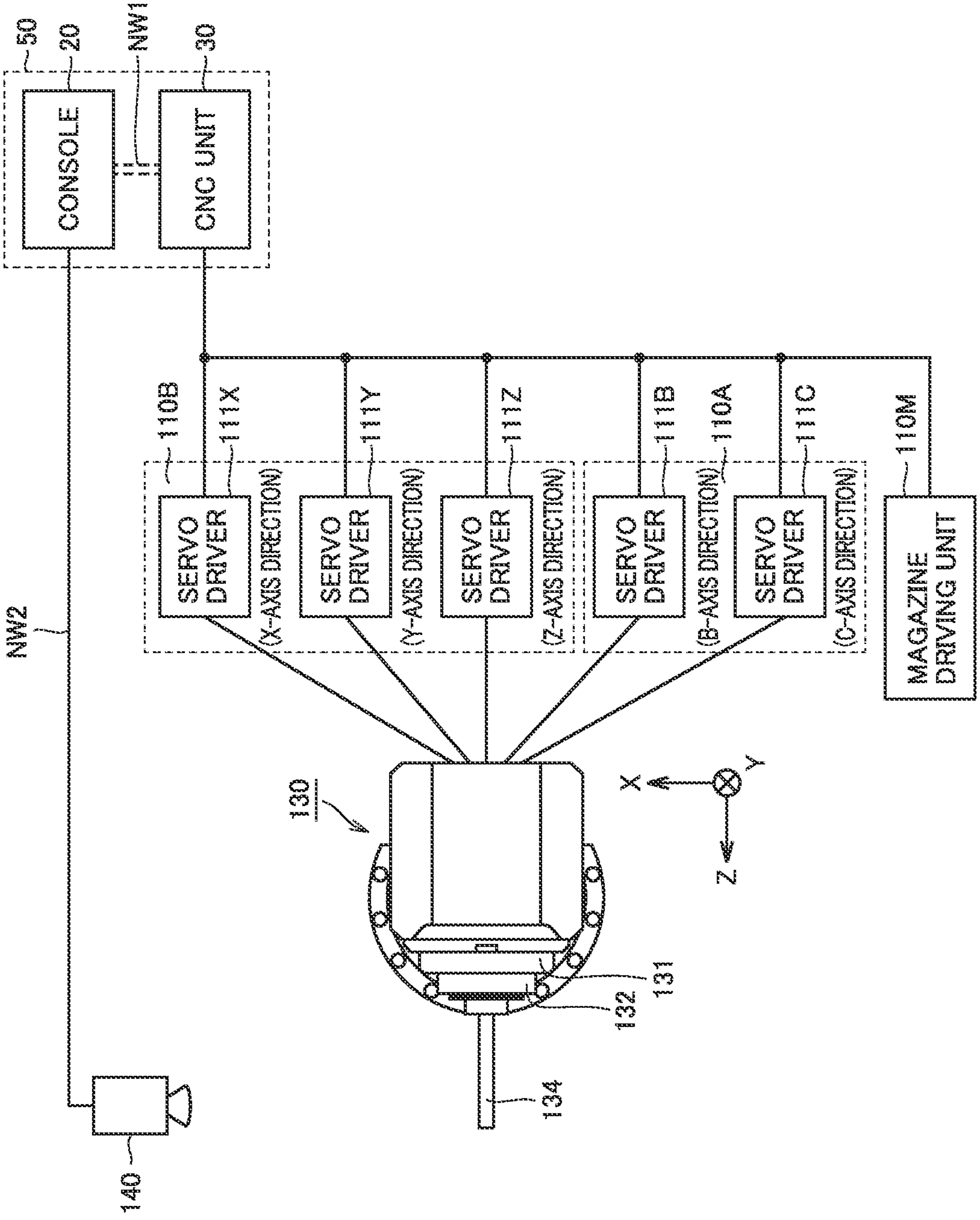
FIG. 3 is a diagram showing an example of a configuration of driving mechanisms in the machine tool.

Next, with reference to FIG. 3, various driving mechanisms in machine tool 10 will be described. FIG. 3 is a diagram showing an example of the configuration of the driving mechanisms in machine tool 10.

As shown in FIG. 3, machine tool 10 includes a control unit 50, a rotation driving unit 110A, a position driving unit 110B, a magazine driving unit 110M (driving device), spindle head 130, and a camera 140.

"Control unit 50" in this Description means a device that controls machine tool 10. The device configuration of control unit 50 is freely selected. Control unit 50 may be composed of a single control unit or may be composed of a plurality of control units. In the example of FIG. 3, control unit 50 is composed of console 20 and CNC unit 30.

Console 20 communicates with CNC unit 30, for example, through a communication path NW1 (e.g., a wireless LAN, a wired LAN, or a field network). Further, console 20 communicates with camera 140 through a communication path NW2 (e.g., a wireless LAN, a wired LAN, or a field network). Console 20 has an image processing program installed therein and executes various types of image processing on images acquired from camera 140.

CNC unit 30 starts execution of a pre-designed processing program based on receiving a processing start command. The processing program is written, for example, as a numerical control (NC) program. CNC unit 30 drives spindle head 130 by controlling rotation driving unit 110A and position driving unit 110B in accordance with the processing program.

Spindle head 130 includes a spindle sleeve 131 and spindle 132. Spindle 132 is rotatably supported by spindle sleeve 131. One tool 134 selected from magazine 170 (see FIG. 1) is attached to spindle 132. Tool 134 rotates in conjunction with spindle 132.

Rotation driving unit 110A is a driving mechanism for changing the angle of spindle 132. As one example, rotation driving unit 110A adjusts the angle in at least one of a rotation direction (A-axis) around an X-axis direction as a rotational axis, a rotation direction (B-axis) around a Y-axis direction as a rotational axis, and a rotation direction (C-axis) around a Z-axis direction as a rotational axis. The device configuration of rotation driving unit 110A is freely selected. Rotation driving unit 110A may be composed of a single driving unit or may be composed of a plurality of driving units. In the example of FIG. 3, rotation driving unit 110A is composed of servo drivers 111B, 111C.

Position driving unit 110B is a driving mechanism for changing the position of spindle 132. As one example, position driving unit 110B adjusts the position in at least one of the X-axis direction, the Y-axis direction, and the Z-axis direction. The device configuration of position driving unit 110B is freely selected. Position driving unit 110B may be composed of a single driving unit or may be composed of a plurality of driving units. In the example of FIG. 3, position driving unit 110B is composed of servo drivers 111X to 111Z.

Servo driver 111B successively receives input of a target rotation speed from CNC unit 30, and controls a servo motor (not shown) for driving the rotation of spindle head 130 in the B-axis direction.

More specifically, servo driver 111B calculates an actual rotation speed of the servo motor from a feedback signal of an encoder (not shown) for detecting a rotational angle of the servo motor, and increases the rotation speed of the servo motor when the actual rotation speed is lower than a target rotation speed, and reduces the rotation speed of the servo motor when the actual rotation speed is higher than the target rotation speed. In this way, servo driver 111B brings the rotation speed of the servo motor close to the target rotation speed while successively receiving feedback on the rotation speed of the servo motor. Thus, servo driver 111B adjusts the rotation speed of spindle head 130 in the B-axis direction.

Servo driver 111C successively receives input of a target rotation speed from CNC unit 30, and controls a servo motor (not shown) for driving the rotation of spindle 132 in a rotation direction with the axial direction of spindle 132 as the center of rotation.

More specifically, servo driver 111C calculates an actual rotation speed of the servo motor from a feedback signal of an encoder (not shown) for detecting a rotational angle of the servo motor, and increases the rotation speed of the servo motor when the actual rotation speed is lower than a target rotation speed, and reduces the rotation speed of the servo motor when the actual rotation speed is higher than the target rotation speed. In this way, servo driver 111C brings the rotation speed of the servo motor close to the target rotation speed while successively receiving feedback on the rotation speed of the servo motor. Thus, servo driver 111C adjusts the rotation speed of spindle 132 in the rotation direction with the axial direction of spindle 132 as the center of rotation.

Servo driver 111X successively receives input of a target position from CNC unit 30 and controls a servo motor (not shown). The servo motor drives, through a ball screw (not shown), feeding of a movable body on which spindle head 130 is mounted to thereby move spindle head 130 to any position in the X-axis direction. A method of controlling the servo motor by servo driver 111X is the same as that by servo drivers 111B, 111C and therefore description thereof will not be repeated.

Servo driver 111Y successively receives input of a target position from CNC unit 30 and controls a servo motor (not shown). The servo motor drives, through a ball screw (not shown), feeding of a movable body on which spindle head 130 is mounted to thereby move spindle 132 to any position in the Y-axis direction. A method of controlling the servo motor by servo driver 111Y is the same as that by servo drivers 111B, 111C and therefore description thereof will not be repeated.

Servo driver 111Z successively receives input of a target position from CNC unit 30 and controls a servo motor (not shown). The servo motor drives, through a ball screw (not shown), feeding of a movable body on which spindle head 130 is mounted to thereby move spindle 132 to any position in the Z-axis direction. A method of controlling the servo motor by servo driver 111Z is the same as that by servo drivers 111B, 111C and therefore description thereof will not be repeated.

While the example in which rotation driving unit 110A is composed of servo drivers has been described above, rotation driving unit 110A may be composed of other motor drivers. As one example, rotation driving unit 110A may be composed of one or more motor drivers for a stepping motor. Similarly, position driving unit 110B may be composed of one or more motor drivers for a stepping motor.

Magazine driving unit 110M is a driving mechanism for driving the rotation of above-described magazine 170 (see FIG. 1). The device configuration of magazine driving unit 110M is freely selected. Magazine driving unit 110M may be composed of a single driving unit or may be composed of a plurality of driving units. As one example, magazine driving unit 110M includes a servo driver (not shown). The servo driver successively receives input of a target position from CNC unit 30 and controls a servo motor (not shown). The servo motor drives the rotation of magazine 170 so as to move a designated tool among the tools held by magazine 170 to any position.

While the example in which magazine driving unit 110M is composed of a servo driver has been described above, magazine driving unit 110M may be composed of another motor driver. As one example, magazine driving unit 110M may be composed of one or more motor drivers for a stepping motor.

Camera 140 is configured to photograph tool 134 attached to spindle 132. Camera 140 may be a charge coupled device (CCD) camera or an infrared camera (thermography) or may be another type of camera.

<D. Functional Mechanisms of Machine Tool 10>

Figure 4:
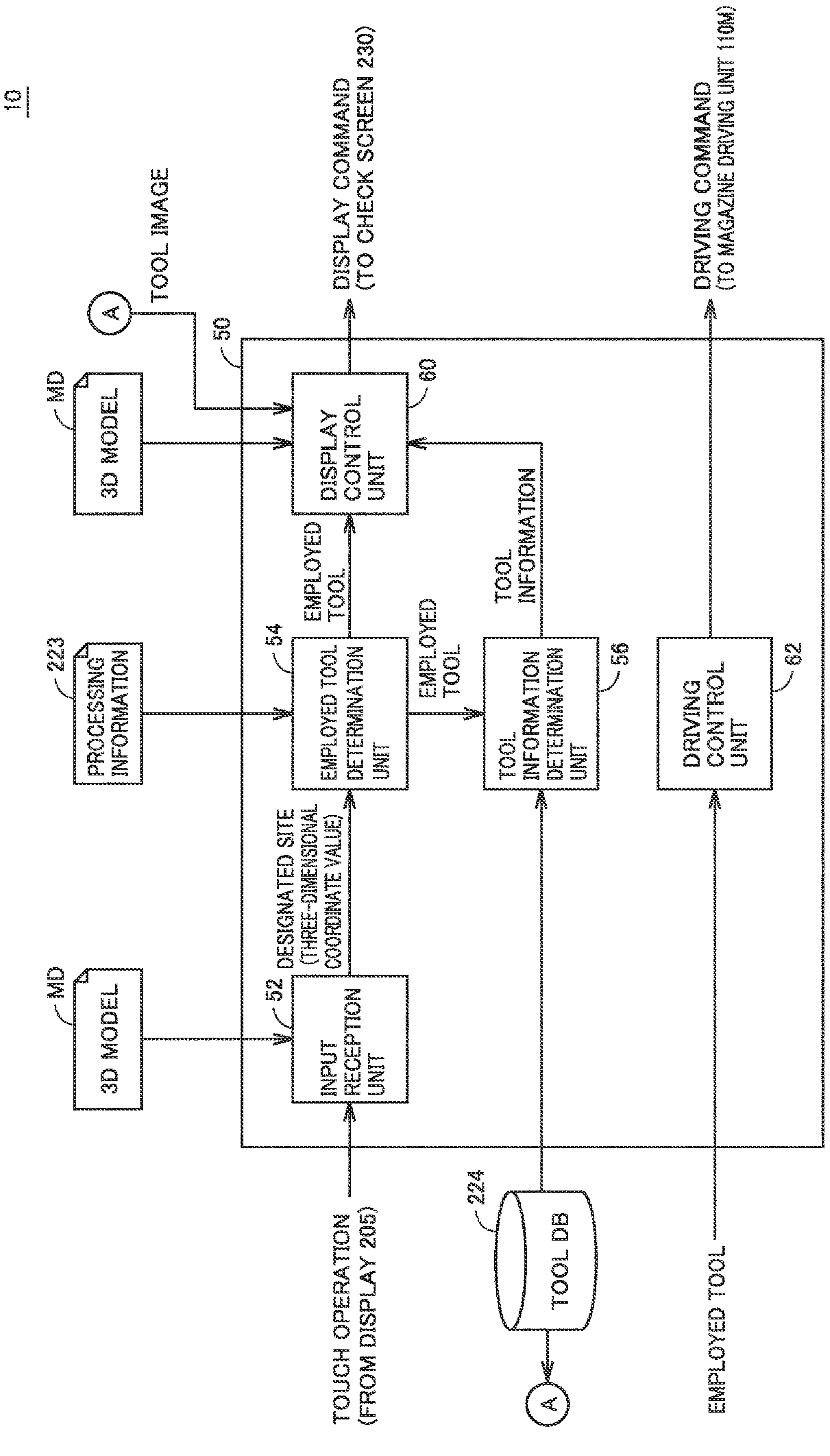
FIG. 4 is a diagram showing one example of functional configurations of the machine tool.

Next, with reference to FIG. 4, functional configurations of machine tool 10 will be described. FIG. 4 is a diagram showing one example of the functional configurations of machine tool 10.

Control unit 50 includes, as examples of functional configurations, an input reception unit 52, an employed tool determination unit 54, a tool information determination unit 56, a display control unit 60, and a driving control unit 62. In the following, these functional configurations will be sequentially described.

All of the functional configurations shown in FIG. 4 may be implemented in above-described console 20 or may be implemented in above-described CNC unit 30. Alternatively some of the functional configurations shown in FIG. 4 may be implemented in above-described console 20 and the rest of the functional configurations may be implemented in above-described CNC unit 30. Alternatively some of the functional configurations shown in FIG. 4 may be implemented in a device other than console 20 and CNC unit 30.

(D1. Input Reception Unit 52)

First, the function of input reception unit 52 shown in FIG. 4 will be described.

Input reception unit 52 is a functional module that receives input of the user's operation from various input devices in machine tool 10. The input devices include, for example, above-described console 20.

As one example, input reception unit 52 receives designation of a site with respect to above-described three-dimensional model MD (see FIG. 2) that is displayed on display 205 of console 20. More specifically, as a touched position on display 205 is indicated by a two-dimensional coordinate value, input reception unit 52 transforms this two-dimensional coordinate value into a three-dimensional coordinate value on three-dimensional model MD in accordance with a predefined coordinate transformation formula. The three-dimensional coordinate value indicates a point of intersection between a straight line extended in a three-dimensional space from the touched position on display 205 in the direction of projection of three-dimensional model MD, and a plane forming three-dimensional model MD. The coordinate value of three-dimensional model MD is output to employed tool determination unit 54.

(D2. Employed Tool Determination Unit 54)

Figure 5:
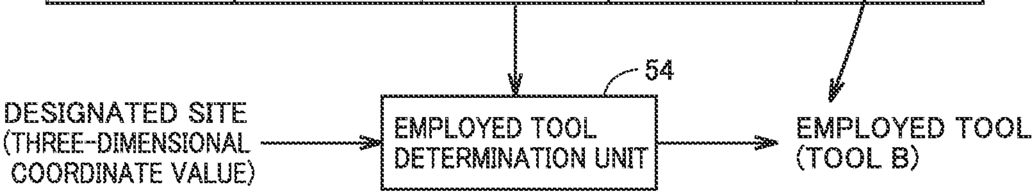
FIG. 5 is a conceptual diagram schematically showing a process of determining an employed tool by an employed tool determination unit.

Next, with reference to FIG. 5 and FIG. 6, the function of employed tool determination unit 54 shown in FIG. 4 will be described. FIG. 5 is a conceptual diagram schematically showing a process of determining an employed tool by employed tool determination unit 54.

Based on processing information 223 shown in FIG. 5, employed tool determination unit 54 determines the employed tool that has processed the site designated on three-dimensional model MD. Processing information 223 specifies at least a tool used in processing the workpiece and a processing route of the tool. In the example of FIG. 5, in processing information 223, a start point of the processing route, an end point of the processing route, a type of the employed tool, a type of the processing route and a G-code for realizing processing along the processing route are specified for each processing route.

Processing information 223 is created by various methods. As one example, some machine tools 10 have a function of automatically creating a processing program as a user answers questions in an interactive form. Processing information 223 is created, for example, by this function.

Figure 6:
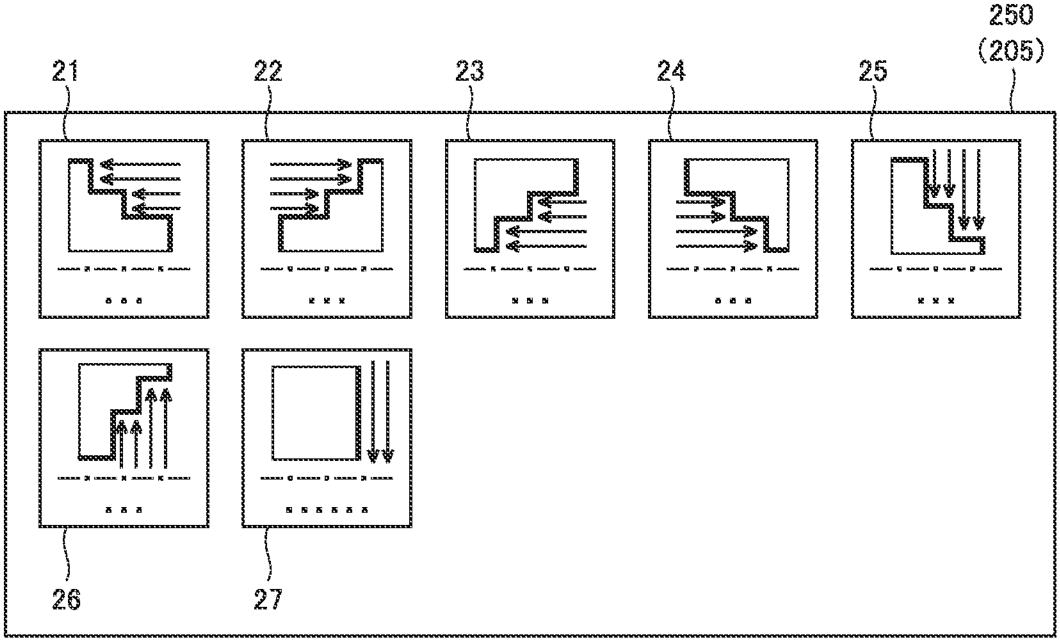
FIG. 6 is a diagram showing one example of a creation screen of a processing program of an interactive form.

FIG. 6 is a diagram showing a creation screen 250 that is one example of creation screens of processing programs in an interactive form. Creation screen 250 is displayed, for example, on display 205 of console 20. In creation screen 250, icons 21 to 27 for designating a processing route are shown. A program code (e.g., a G-code) for realizing processing shown in the icon is associated with each of icons 21 to 27. In the program code, a processing route, an employed tool, or the like are specified.

Icons 21 to 27 shown in FIG. 6 represent some of icons that the user can select. By selecting various icons according to a dialog, the user can create any processing program. In the process, information specifying the processing route, and the employed tools employed in the processing route are specified in processing information 223. Here, three-dimensional model MD of a workpiece obtained by processing based on processing information 223 may be further created.

The data form of processing information 223 is not limited to the form shown in FIG. 5. Processing information 223 can be any information that includes at least a tool used in processing the workpiece and a processing route of the tool. As one example, processing information 223 may be a processing program itself.

While the function in which a processing program is created by an automatic creation function of an interactive form has been described above, the processing program may be designed by a worker writing a program code.

Employed tool determination unit 54 determines, as a route candidate, a processing route corresponding to the site designated on three-dimensional model MD among processing routes specified in processing information 223. More specifically, for each processing route specified in processing information 223, employed tool determination unit 54 calculates a distance between the processing route and the site designated on three-dimensional model MD.

In one aspect, employed tool determination unit 54 determines, as a route candidate, a processing route of which the calculated distance is equal to or shorter than a predetermined value. In another aspect, employed tool determination unit 54 determines, as route candidates, a predetermined number of processing routes of which the calculated distances are shortest. The predetermined number is an integer of 1 or more.

Next, employed tool determination unit 54 determines the tool type associated with the determined route candidate with reference to processing information 223. The determined tool is regarded as the employed tool that has been involved in processing the site designated on three-dimensional model MD. In the example of FIG. 5, "tool B" is determined as the employed tool.

(D3. Tool Information Determination Unit 56)

Figure 7:
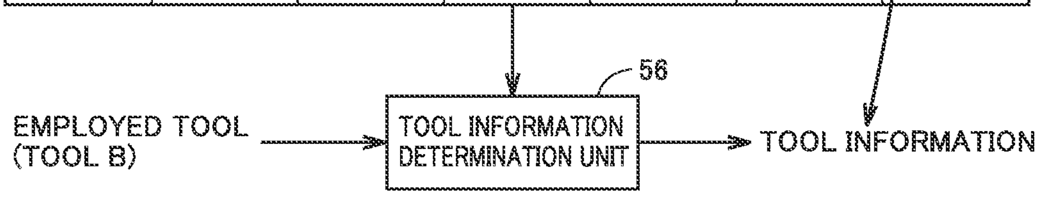
FIG. 7 is a conceptual diagram schematically showing a process of determining tool information by a tool information determination unit.

Next, with reference to FIG. 7, the function of tool information determination unit 56 shown in FIG. 4 will be described. FIG. 7 is a conceptual diagram schematically showing a process of determining tool information by tool information determination unit 56.

Tool information determination unit 56 determines tool information relating to the employed tool determined by employed tool determination unit 54.

More specifically, first, tool information determination unit 56 acquires a tool database 224. Tool database 224 may be stored in machine tool 10 in advance or may be acquired from an external server. Tool database 224 specifies tool information on a tool-by-tool basis. The tool information includes a tool number for uniquely identifying the tool, a tool type showing a type of tool, the tool name, tool size information, such as the tool thickness and the tool length, and a tool image representing the tool.

Each tool image included in tool database 224 is, for example, an image obtained from above-described camera 140. Camera 140 photographs a tool at various timings, such as before the start of processing of a workpiece and after the end of processing of a workpiece.

Tool information determination unit 56 determines the tool type corresponding to the employed tool determined by employed tool determination unit 54 among the tool types specified in tool database 224. Thereafter, tool information determination unit 56 acquires tool information associated with the determined tool type. In the example of FIG. 7, tool information relating to "tool B" has been acquired. The tool information to be acquired includes, for example, at least one of the tool name, the tool size information, such as the tool thickness and the tool length, and the tool image.

While the example in which the tool size information, such as the tool thickness and the tool length, is specified in tool database 224 in advance has been described above, the size of the tool may be determined by another method.

In one aspect, tool information determination unit 56 may determine the size of the tool based on a tool image obtained from camera 140. More specifically, tool information determination unit 56 drives the employed tool determined by employed tool determination unit 54 to a front side of camera 140 and causes camera 140 to photograph the employed tool. Next, tool information determination unit 56 executes predetermined image processing on the tool image obtained from camera 140 to thereby search for the tool part in the tool image. For the process of searching for the tool part, various types of existing image processing are used. Tool information determination unit 56 determines size information on the employed tool based on the tool part searched out from the tool image.

In another aspect, tool information determination unit 56 may measure the size of the employed tool using a distance sensor, such as a laser sensor, or another measurement instrument.

(D4. Display Control Unit 60)

Figure 8:
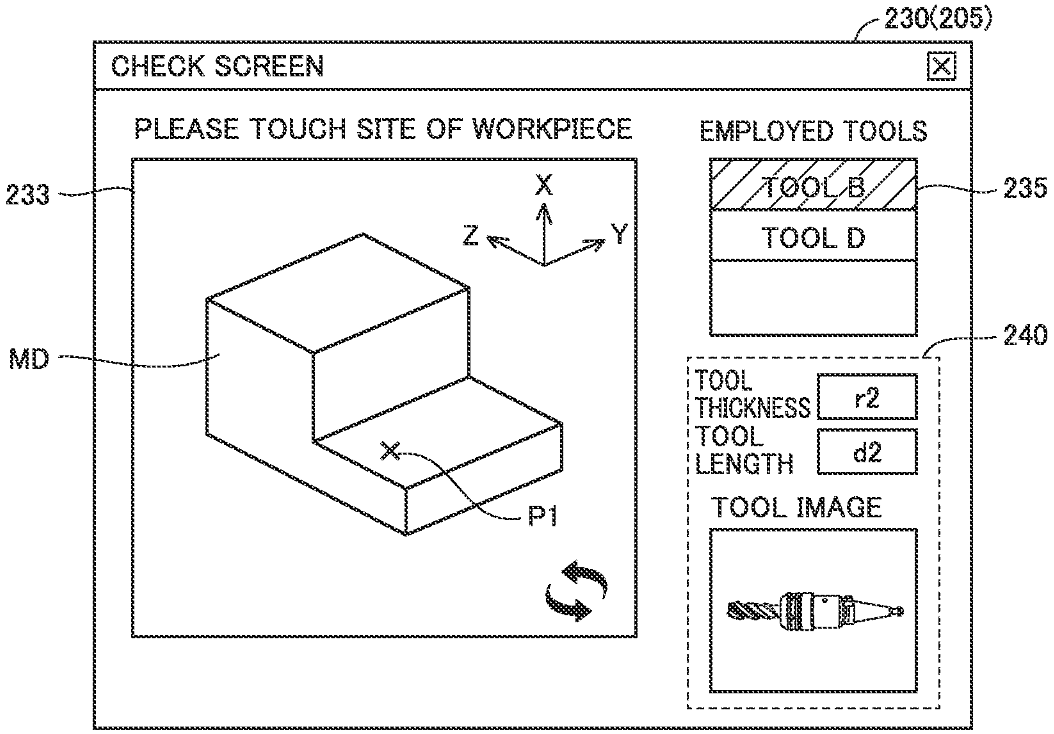
FIG. 8 is a diagram showing a check screen according to a modified example.

Next, with reference to FIG. 8, functions of display control unit 60 shown in FIG. 4 will be described. FIG. 8 is a diagram showing a modified example of check screen 230 shown in FIG. 2 described above.

Check screen 230 shown in FIG. 8 differs from check screen 230 shown in FIG. 2 in that it further includes a display region 240 for the tool information. The rest is the same as that in check screen 230 shown in FIG. 2, and therefore description of the rest will not be repeated.

Display control unit 60 not only displays the employed tool determined by employed tool determination unit 54 in display region 235 but also displays the tool information determined by tool information determination unit 56 in display region 240. Thus, display control unit 60 displays, in display region 240, information on the employed tool that has processed site P1 designated in three-dimensional model MD.

Typically, employed tools displayed in display region 235 are configured to be selectable, and tool information relating to a selected employed tool is displayed in display region 240. In the example of FIG. 8, "tool B" is selected and tool information relating to "tool B" is displayed in display region 240.

As one example, the tool information displayed in display region 240 includes size information on the employed tool. The size information includes at least one of the tool thickness of the employed tool and the tool length of the employed tool. By checking the size information, the worker can learn the size information on the tool having been involved in processing site P1.

As another example, the tool information displayed in display region 240 includes a tool image showing the employed tool. By checking the size information, the worker can check in the image the state of the tool having been involved in processing site P1 and detect wearing or chipping of the tool.

The tool image displayed in display region 240 may be a tool image representing a past employed tool or a tool image representing a state of a present employed tool. A tool image representing a past employed tool is acquired, for example, from above-described tool database 224.

A tool image representing a present employed tool is acquired, for example, as the employed tool designated in display region 235 is driven to the front side of camera 140. More specifically, based on a specific, employed tool having been designated in display region 235, machine tool 10 determines the employed tool among the tools housed in magazine 170 (see FIG. 1) and attaches that employed tool to spindle 132 using ATC 160 (see FIG. 1). Thereafter, machine tool 10 drives spindle 132 such that the employed tool is included in a photographing field of view of camera 140 and outputs a photographing instruction to camera 140. Thus, a tool image representing the present employed tool is acquired from camera 140.

The employed tool need not be necessarily photographed in a state of being attached to spindle 132. As one example, the employed tool may be photographed by camera 140 at a predetermined position inside magazine 170. Thus, a tool image representing the employed tool inside magazine 170 is acquired from camera 140 and displayed in display region 240.

Further, the employed tool need not necessarily be photographed as the whole tool. Camera 140 may photograph a part of the employed tool, such as a cutting edge portion. In this case, a tool image representing a part of the present employed tool is acquired from camera 140 and displayed in display region 240.

Figure 9:
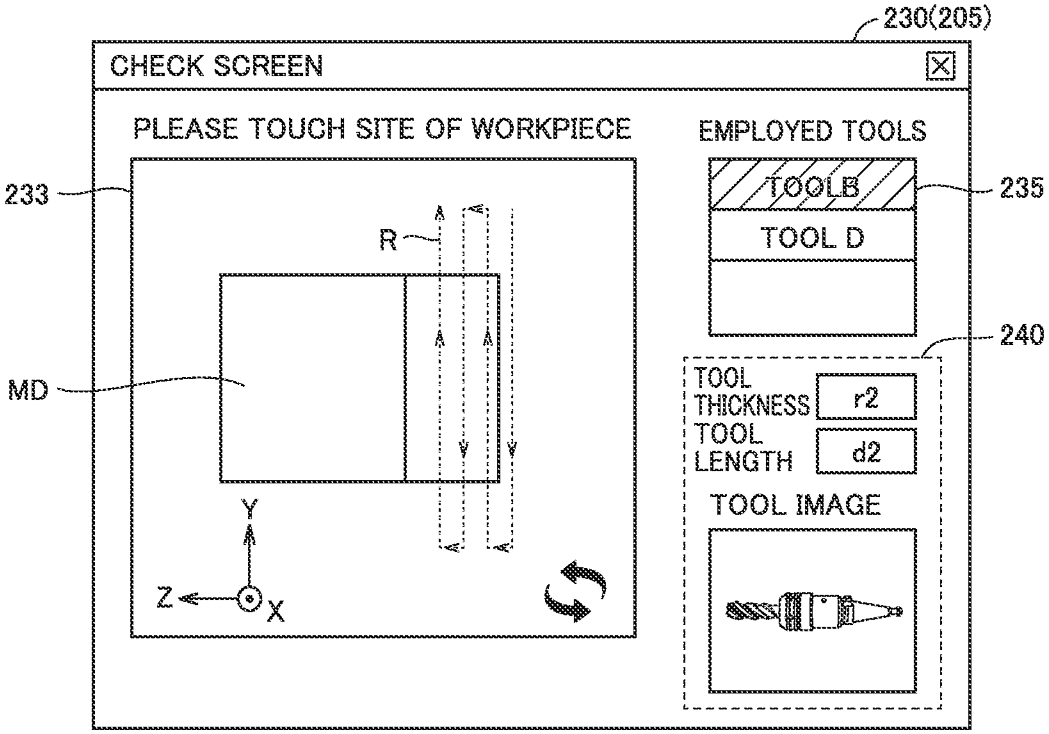
FIG. 9 is a diagram showing a check screen according to a modified example.

FIG. 9 is a diagram showing check screen 230 according to a modified example. As shown in FIG. 9, display control unit 60 preferably further displays a processing route R of the employed tool as superimposed on three-dimensional model MD displayed on display 205. Thus, the user can visually understand processing route R of the tool that has processed the designated site in three-dimensional model MD.

As a more specific process, based on one employed tool having been selected from among the employed tools displayed in display region 235, display control unit 60 determines a processing route associated with the one employed tool with reference to above-described processing information 223 (see FIG. 5). As this processing route is shown as a route in a three-dimensional space, display control unit 60 transforms this route into a two-dimensional processing route R based on the direction of projection of three-dimensional model MD by projection transformation. Thereafter, display control unit 60 displays two-dimensional processing route R representing the processing route in a three-dimensional space from the direction of projection as superimposed on a projected image of three-dimensional model MD.

(D5. Driving Control Unit 62)

Next, with reference to FIG. 8 described above, functions of driving control unit 62 shown in FIG. 4 will be described.

As described above, employed tools displayed in display region 235 are configured to be selectable. Based on one employed tool having been selected from among the employed tools displayed in display region 235, driving control unit 62 controls magazine driving unit 110M (see FIG. 3) so as to drive the one employed tool present inside magazine 170 (see FIG. 1) to a predefined position. The predefined position is a position at which the worker can take out the tool, and is specified in a control program of magazine 170 in advance.

Thus, the worker can visually check a state of the employed tool having been involved in processing the flawed portion of the workpiece, and can detect wearing or chipping of the tool.

<E. Hardware Configuration of Console 20>

Figure 10:
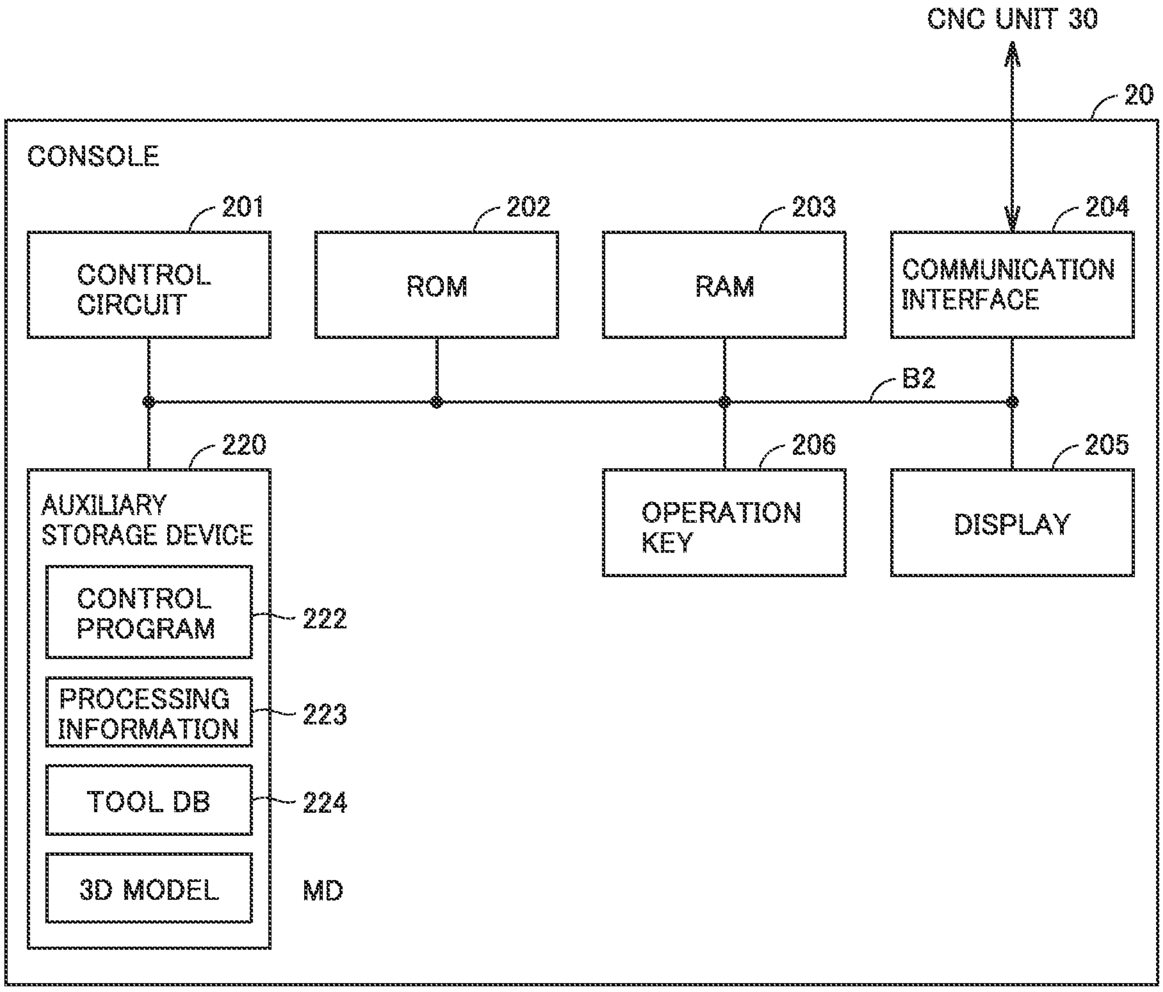
FIG. 10 is a block diagram showing one example of the hardware configuration of the console.

Next, with reference to FIG. 10, the hardware configuration of console 20 will be described. FIG. 10 is a block diagram showing one example of the hardware configuration of console 20.

Console 20 includes a control circuit 201, a read only memory (ROM) 202, a random access memory (RAM) 203, a communication interface 204, display 205, operation keys 206, and an auxiliary storage device 220. These configurations are connected to an internal bus B1.

Control circuit 201 is composed of, for example, at least one integrated circuit. The integrated circuit can be composed of, for example, at least one central processing unit (CPU), at least one graphics processing unit (GPU), at least one application specific integrated circuit (ASIC), at least one field programmable gate array (FPGA), or a combination of them.

Control circuit 201 controls the operation of console 20 by executing various programs, such as a control program 222. Control program 222 is a program for realizing the various functional configurations shown in FIG. 4. Based on receiving an order to execute various programs, control circuit 201 retrieves the programs from auxiliary storage device 220 or ROM 202 to RAM 203. RAM 203 functions as a working memory and temporarily stores various pieces of data necessary for the execution of various programs.

Communication interface 204 is a communication unit for realizing communication using a local area network (LAN) cable, a WLAN, Bluetooth®, or the like. As one example, console 20 realizes communication with external devices, such as CNC unit 30 (see FIG. 3), to be described later, through communication interface 204.

Display 205 is, for example, a liquid crystal display, an organic EL display, or another display device. Display 205 sends an image signal for displaying an image for display 205 in accordance with a command from control circuit 201, or the like. For example, display 205 is formed by a touch panel and receives various operations on machine tool 10 through a touch operation.

Operation keys 206 are composed of a plurality of hardware keys and receive various user operations on console 20. A signal corresponding to a pressed key is output to control circuit 201.

Auxiliary storage device 220 is, for example, a storage medium, such as a hard disc or a flash memory. Auxiliary storage device 220 stores control program 222, above-described processing information 223, above-described tool database 224, above-described three-dimensional model MD, and others. A place to store these is not limited to auxiliary storage device 220, and these may be stored in a storage area (e.g., a cache memory) of control circuit 201, ROM 202, RAM 203, an external device (e.g., a server), or the like.

Control program 222 may be provided not as a standalone program but by being incorporated as a part of any program. In this case, various processes according to this embodiment are realized in cooperation with any program. Such a program that does not include some of the modules does not depart from the intent and purpose of control program 222 according to this embodiment. Further, some or all of the functions provided by control program 222 may be realized by dedicated hardware. Moreover, console 20 may be configured in a form such as a so-called cloud service in which at least one server executes some of the processes of control program 222.

<F. Hardware Configuration of CNC Unit 30>

Figure 11:
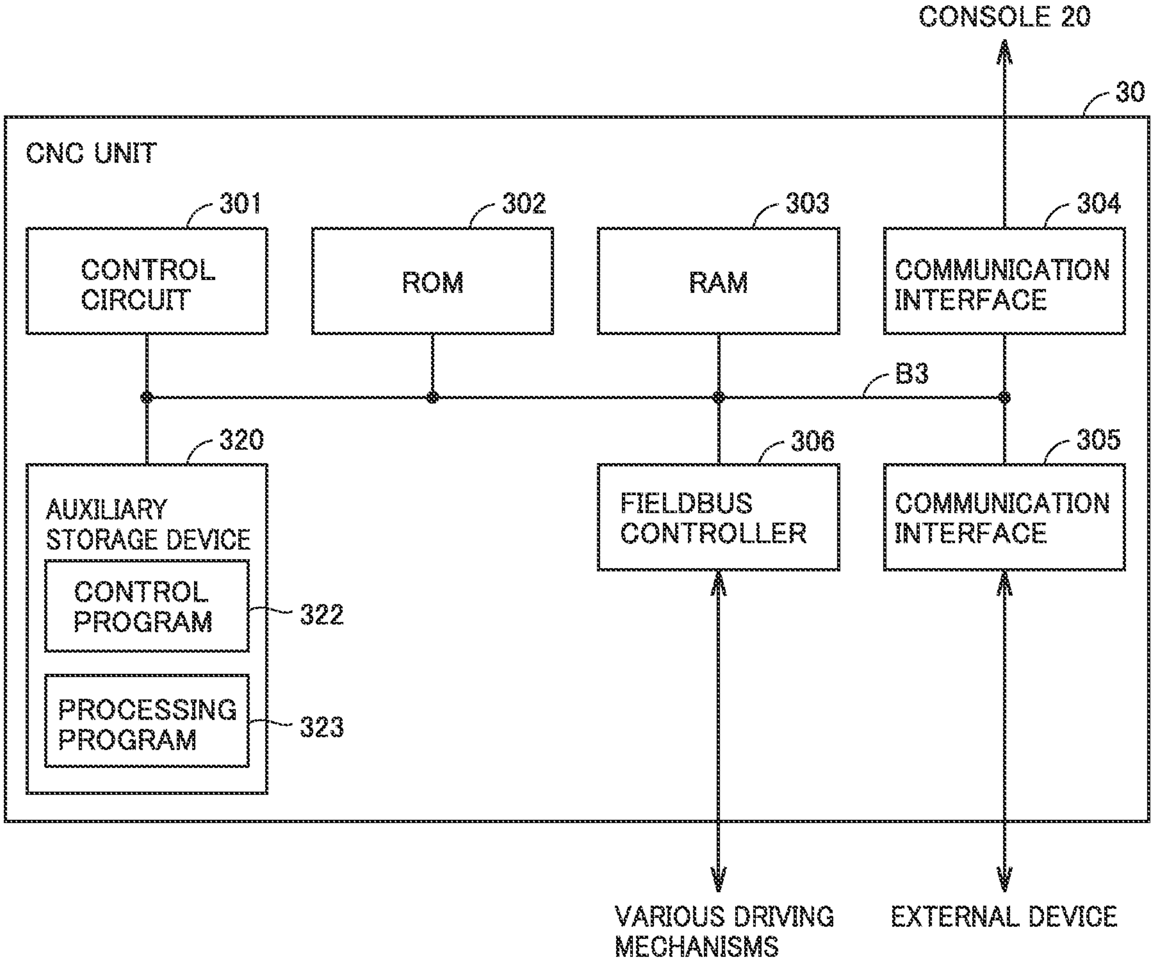
FIG. 11 is a block diagram showing one example of the hardware configuration of a computer numerical control (CNC) unit.

Next, with reference to FIG. 11, the hardware configuration of CNC unit 30 will be described. FIG. 11 is a block diagram showing one example of the hardware configuration of CNC unit 30.

CNC unit 30 includes a control circuit 301, an ROM 302, an RAM 303, communication interfaces 304, 305, a fieldbus controller 306, and an auxiliary storage device 320. These configurations are connected to an internal bus B3.

Control circuit 301 is composed of, for example, at least one integrated circuit. The integrated circuit can be composed of, for example, at least one CPU, at least one GPU, at least one ASIC, at least one FPGA, or a combination of these.

Control circuit 301 controls the operation of CNC unit 30 by executing various programs including a control program 322 and a processing program 323. Control circuit 301 retrieves control program 322 from ROM 302 to RAM 303 based on receiving an order to execute control program 322. RAM 303 functions as a working memory and temporarily stores various pieces of data necessary for the execution of control program 322.

Communication interfaces 304, 305 are communication units for realizing communication using an LAN, a WLAN, Bluetooth, or the like. CNC unit 30 exchanges data with an external device (e.g., console 20) through communication interface 304. Further, CNC unit 30 exchanges data with external devices (e.g., a server) through communication interface 305.

Fieldbus controller 306 is a communication unit for realizing communication with various units connected to a fieldbus. As one example of units connected to the fieldbus, above-described rotation driving unit 110A (see FIG. 3), above-described position driving unit 110B (see FIG. 3), above-described magazine driving unit 110M (see FIG. 3), or the like can be named.

Auxiliary storage device 320 is, for example, a storage medium such as a hard disc or a flash memory. Auxiliary storage device 320 stores control program 322, processing program 323, and others. A place to store these is not limited to auxiliary storage device 320, and these may be stored in a storage area (e.g., a cache memory) of control circuit 301, ROM 302, RAM 303, an external device (e.g., a server), or the like.

<G. Flowchart>

Figure 12:
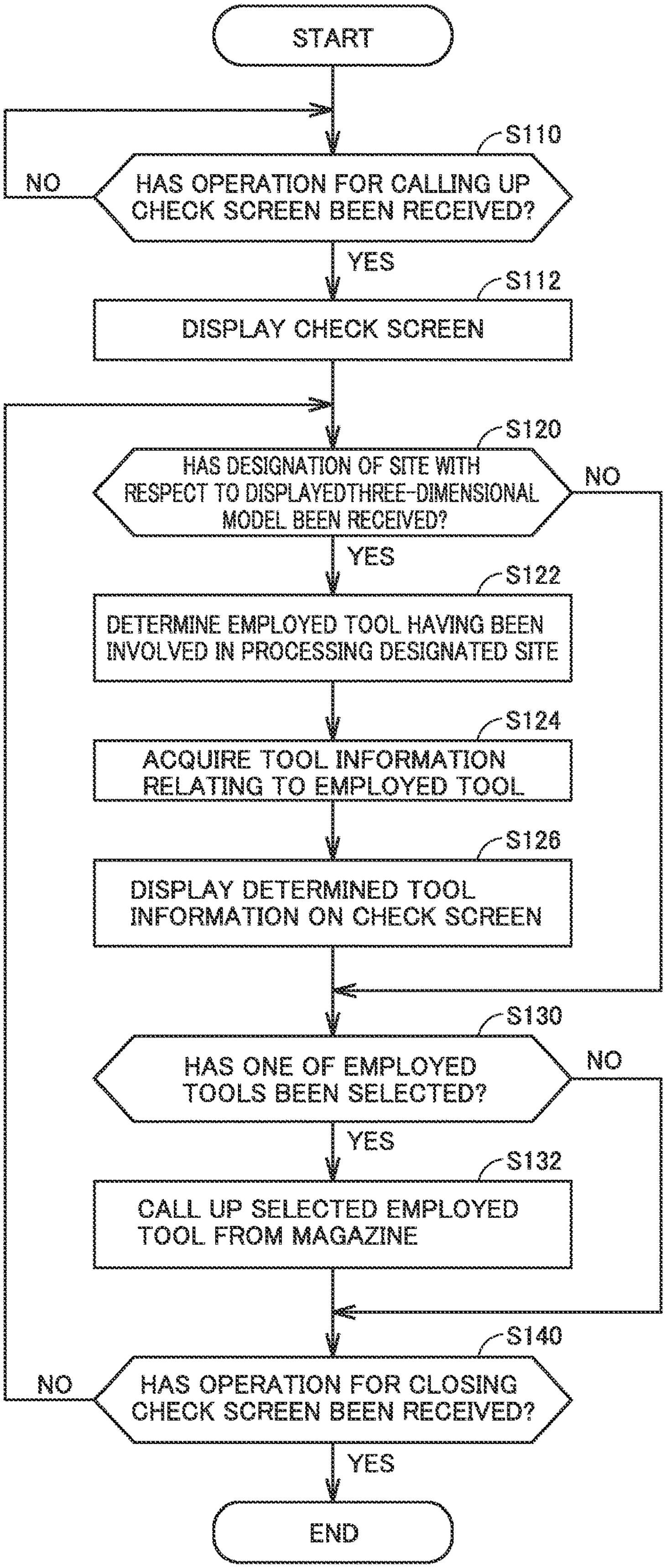
FIG. 12 is a flowchart showing a flow of controlling display of the check screen.

Next, with reference to FIG. 12, a flow of displaying above-described check screen 230 (see FIG. 2) will be described. FIG. 12 is a flowchart showing a flow of controlling display of above-described check screen 230 (see FIG. 2).

The process shown in FIG. 12 is realized as control unit 50 of machine tool 10 executes above-described control program 222. In another aspect, part or the whole of the process may be executed by a circuit element or another hardware.

In step S110, control unit 50 determines whether an operation for calling up above-described check screen 230 has been received. The user can call up check screen 230 by, for example, a touch operation on display 205 of console 20 or key input on operation keys 206 of console 20. When control unit 50 determines that an operation for calling up check screen 230 has been received (YES in step S110), control unit 50 switches the control to step S112. Otherwise (NO in step S110), control unit 50 executes the process of step S110 again.

In step S112, control unit 50 functions as display control unit 60 (see FIG. 4) and displays check screen 230 on display 205 of console 20. Check screen 230 is configured to be able to read three-dimensional model MD of a workpiece, and displays a projected image of read three-dimensional model MD in display region 233.

In step S120, control unit 50 functions as input reception unit 52 (see FIG. 4) and determines whether designation of a site with respect to three-dimensional model MD displayed in check screen 230 has been received. The user can designate a site of three-dimensional model MD by, for example, a touch operation on display 205 of console 20 or key input on operation keys 206 of console 20. When control unit 50 determines that designation of a site of three-dimensional model MD has been received (YES in step S120), control unit 50 switches the control to step S122. Otherwise (NO in step S120), control unit 50 switches the control to step S130.

In step S122, control unit 50 functions as employed tool determination unit 54 (see FIG. 4), and determines the employed tool that has been involved in processing the site designated in step S120 with reference to above-described processing information 223 (see FIG. 5). The method of determining the employed tool is as described above, and therefore description thereof will not be repeated.

In step S124, control unit 50 functions as tool information determination unit 56 (see FIG. 4) and acquires tool information relating to the employed tool determined in step S122 from above-described processing information 223 (see FIG. 5). The method of determining tool information relating to the employed tool is as described above, and therefore description thereof will not be repeated. The tool information to be acquired includes, for example, at least one of the identification information on the employed tool (e.g., the tool name or the tool ID), the size information on the employed tool (e.g., the tool thickness or the tool length), and a tool image.

In step S126, control unit 50 functions as display control unit 60 (see FIG. 4) and displays tool information determined in step S124.

In step S130, control unit 50 functions as input reception unit 52 (see FIG. 4), and determines whether one employed tool has been selected from among the employed tools displayed in display region 235 of check screen 230. The user can select the employed tool by, for example, a touch operation on display 205 of console 20 or key input on operation keys 206 of console 20. When control unit 50 determines that one employed tool has been selected from among the employed tools displayed in display region 235 of check screen 230 (YES in step S130), control unit 50 switches the control to step S132. Otherwise (NO in step S130), control unit 50 switches the control to step S140.

In step S132, control unit 50 functions as driving control unit 62 (see FIG. 4), and determines the employed tool selected in step S130 among the tools held in magazine 170 (see FIG. 1), and controls magazine driving unit 110M (see FIG. 3) so as to drive this employed tool to a predefined position.

In step S140, control unit 50 determines whether an operation for closing above-described check screen 230 (see FIG. 2) has been received. The user can close check screen 230 by, for example, a touch operation on display 205 of console 20 or key input on operation keys 206 of console 20. When control unit 50 determines that an operation for closing check screen 230 has been received (YES in step S140), control unit 50 ends the process shown in FIG. 12. Otherwise (NO in step S140), control unit 50 returns to step S120.

The embodiment disclosed this time should be construed as being in every respect illustrative and not restrictive. The scope of the present invention is shown not by the description given above but by the claims, and is intended to include all changes that are equivalent in meaning and scope to the claims.

REFERENCE SIGNS LIST

10 Machine tool, 20 Console, 21 to 27 Icon, 30 CNC unit, 50 Control unit, 52 Input reception unit, 54 Employed tool determination unit, 56 Tool information determination unit, 60 Display control unit, 62 Driving control unit, 110A Rotation driving unit, 110B Position driving unit, 110M Magazine driving unit, 111B, 111C, 111X, 111Y, 111Z Servo driver, 130 Spindle head, 131 Spindle sleeve, 132 Spindle, 134 Tool, 140 Camera, 160 ATC, 170 Magazine, 201, 301 Control circuit, 202, 302 ROM, 203, 303 RAM, 204, 304, 305 Communication interface, 205 Display, 206 Operation key, 220, 320 Auxiliary storage device, 222, 322 Control program, 223 Processing information, 224 Tool database, 230 Check screen, 233, 235, 240 Display region, 250 Creation screen, 306 Fieldbus controller, 323 Processing program

The invention claimed is:

1. A machine tool capable of processing a workpiece, the machine tool comprising:

a display; and a control unit for controlling the machine tool, wherein the control unit executes:

a process of acquiring processing information that specifies a tool used in the processing the workpiece and a processing route of the tool in the processing;

a process of displaying, on the display, a three-dimensional model of the workpiece created based on the processing information;

a process of receiving designation of a site of the three-dimensional model displayed on the display by a user touching the site, where the site corresponds to a portion of the workpiece after being processed, the site including a defect by the processing;

a process of determining, based on the processing information, the tool that has been used in the processing the site with the defect; and a process of displaying information of the tool on the display in response to the designation of the site with the defect.

2. The machine tool according to claim 1, wherein the control unit further executes:

a process of acquiring a database in which pieces of size information on tools are associated on a tool-by-tool basis; and a process of acquiring size information associated with the employed tool among the pieces of size information specified in the database, wherein the information displayed on the display in the process of displaying includes the size information acquired in the process of acquiring.

3. The machine tool according to claim 1, wherein the machine tool further includes a camera provided inside the machine tool, the control unit further executes a process of acquiring a tool image representing the employed tool from the camera, and the information displayed on the display in the process of displaying includes the tool image.

4. The machine tool according to claim 1, wherein the machine tool further comprises:

a magazine capable of holding a plurality of tools; and a driving device for driving the magazine, and wherein the control unit further executes:

a process of receiving designation of one employed tool among the employed tools displayed on the display; and a process of controlling the driving device so as to drive the designated one employed tool among the plurality of tools housed in the magazine to a predefined position.

5. The machine tool according to claim 1, wherein the control unit executes a process of further displaying a processing route of the employed tool as superimposed on the three-dimensional model.

6. A control method of a machine tool capable of processing a workpiece, the control method executing:

acquiring processing information that specifies a tool used in the processing the workpiece and a processing route of the tool in the processing;

displaying, on a display of the machine tool, a three-dimensional model of the workpiece created based on the processing information;

receiving designation of a site of the three-dimensional model displayed on the display by a user touching the site, where the site corresponds to a portion of the workpiece after being processed, the site including a defect by the processing;

determining, based on the processing information, the tool that has been used in the processing the site with the defect; and displaying information of the tool on the display in response to the designation of the site with the defect.

7. A non-transitory computer readable storage medium having stored therein a control program of a machine tool capable of processing a workpiece, the control program causing the machine tool to execute:

acquiring processing information that specifies a tool used in the processing the workpiece and a processing route of the tool in the processing;

displaying, on a display of the machine tool, a three-dimensional model of the workpiece created based on the processing information;

receiving designation of a site of the three-dimensional model displayed on the display by a user touching the site, where the site corresponds to a portion of the workpiece after being processed, the site including a defect by the processing;

determining, based on the processing information, the tool that has been used in the processing the site with the defect; and displaying information of the tool on the display in response to the designation of the site with the defect.

* * * * *